(12) United States Patent
Park

(10) Patent No.: US 9,097,285 B2
(45) Date of Patent: Aug. 4, 2015

(54) MAGNETIC ENCODER TYPE HUB BEARING UNIT

(71) Applicant: HYUNDAI MOBIS CO., LTD., Seoul (KR)

(72) Inventor: Jong-Sung Park, Yongin-si (KR)

(73) Assignee: Hyundai Mobis Co., Ltd. (KR)

( * ) Notice: Subject to any disclaimer, the term of this patent is extended or adjusted under 35 U.S.C. 154(b) by 0 days.

(21) Appl. No.: 14/494,343

(22) Filed: Sep. 23, 2014

(65) Prior Publication Data

US 2015/0131934 A1 May 14, 2015

(30) Foreign Application Priority Data

Nov. 12, 2013 (KR) .......................... 10-2013-0136819

(51) Int. Cl.
| | |
|---|---|
| *F16C 33/76* | (2006.01) |
| *F16C 41/00* | (2006.01) |
| *F16C 19/18* | (2006.01) |
| *G01P 3/44* | (2006.01) |

(52) U.S. Cl.
CPC ............. *F16C 41/007* (2013.01); *F16C 19/185* (2013.01); *G01P 3/443* (2013.01)

(58) Field of Classification Search
CPC ........................... F16C 41/007; F16C 2326/02
USPC .................................................. 384/448, 489
See application file for complete search history.

(56) References Cited

U.S. PATENT DOCUMENTS

| | | | |
|---|---|---|---|
| 6,217,220 B1 * | 4/2001 | Ohkuma et al. ............... | 384/489 |
| 8,888,372 B2 * | 11/2014 | Ciulla et al. .................. | 384/448 |
| 2013/0028548 A1 * | 1/2013 | Komori et al. ................ | 384/448 |

FOREIGN PATENT DOCUMENTS

KR    10-2006-0007552 A    1/2006

* cited by examiner

*Primary Examiner* — Phillip A Johnson
(74) *Attorney, Agent, or Firm* — Knobbe, Martens, Olson & Bear LLP

(57) ABSTRACT

A magnetic encoder type hub bearing unit may include a sealed cap which is coupled to a knuckle for fixing a hub bearing located on a hub so that an inner space for blocking the hub bearing to the outside is defined, an inner housing made of a steel material being exposed toward the inner space, an encoder which is located in the inner space while being spaced apart from a surface of the inner housing, and a WSS (Wheel Speed Sensor) which is inserted into the sealed cap such that a sensor head portion is located toward the surface of the inner housing, wherein an air gap is formed by a distance between the encoder and the surface of the inner housing and a thickness of the inner housing.

20 Claims, 3 Drawing Sheets

MAGNETIC ENCODER TYPE HUB BEARING UNIT

CROSS-REFERENCE TO RELATED APPLICATIONS

This application claims priority to Korean Patent Application No. 10-2013-0136819, filed on Nov. 12, 2013, which is incorporated herein by reference in its entirety.

BACKGROUND

1. Field

Exemplary embodiments of the present invention relate to a hub bearing; and, particularly, to a magnetic encoder type hub bearing unit capable of reducing an air gap and minimizing contamination on a wheel speed sensor (hereinafter, referred to as "WSS") head due to external foreign matters by preventing exposure of the WSS to the outside.

2. Description of Related Art

In general, a vehicle wheel is provided with a hub bearing is located between a disc part to which a brake is mounted and a bracket forming a suspension. The hub bearing is equipped with a magnetic encoder linked with a WSS.

Thus, a structure in which the hub bearing, the WSS, and the magnetic encoder are linked to each other is referred to as a magnetic encoder type hub bearing.

In this structure, the magnetic encoder is located within a steel cap for covering the hub bearing so as to prevent exposure of the magnetic encoder to the outside, and the WSS is installed at the magnetic encoder in the outside of the steel cap so that an air gap is formed between the WSS and the magnetic encoder and the WSS is exposed to the outside.

Typically, sensitivity of the WSS to the magnetic encoder may be improved as the air gap affecting performance of the WSS becomes smaller.

However, since the WSS is mounted outside the steel cap, the air gap may be increased due to an assembly tolerance between the WSS and the steel cap.

In particular, since the air gap is set by a distance between the encoder and the steel cap, a thickness of the steel cap, and a distance between the steel cap and the WSS, there is a limit in reducing the air gap.

In addition, since the WSS is exposed to an external environment, a WSS head for sensing the magnetic encoder may be contaminated due to external foreign matters. Particularly, a possibility of malfunction of the WSS may be significantly increased due to introduction of magnetic foreign matters through the air gap.

SUMMARY

An embodiment of the present invention is directed to a magnetic encoder type hub bearing unit capable of minimizing an air gap and thus improving performance of a WSS by directly installing the WSS inside a sealed cap for blocking a hub bearing from the outside, and particularly of preventing contamination on a WSS head due to external foreign matters or malfunction of the WSS due to magnetic foreign matters by preventing exposure of the WSS head to the outside using the sealed cap.

Other features and advantages of the present invention can be understood by the following description, and become apparent with reference to the embodiments of the present invention. Also, it is obvious to those skilled in the art to which the present invention pertains that the features and advantages of the present invention can be realized by the means as claimed and combinations thereof.

In accordance with an embodiment of the present invention, a magnetic encoder type hub bearing unit includes a sealed cap which is coupled to a knuckle for fixing a hub bearing located on a hub so that an inner space for blocking the hub bearing to the outside is defined, an inner housing made of a steel material being exposed toward the inner space, an encoder which is located in the inner space while being spaced apart from a surface of the inner housing, and a WSS which is inserted into the sealed cap such that a sensor head portion is located toward the surface of the inner housing, wherein an air gap is formed by a distance between the encoder and the surface of the inner housing and a thickness of the inner housing.

The sealed cap may include an outer housing which is made of a plastic material and encloses the inner housing, and a sensor boss which is integrally formed in the outer housing so that the WSS is inserted into the sensor boss.

The sensor boss may be formed with a mounting hole into which the WSS is inserted, and the surface of the inner housing may be exposed through the mounting hole.

The encoder may be attached to an encoder plate and the encoder plate may be coupled with an encoder support ring fixed to a hub shaft of the hub.

A sensor head of the WSS may be pressed against the surface of the inner housing.

DESCRIPTION OF EMBODIMENTS

Figure 1:
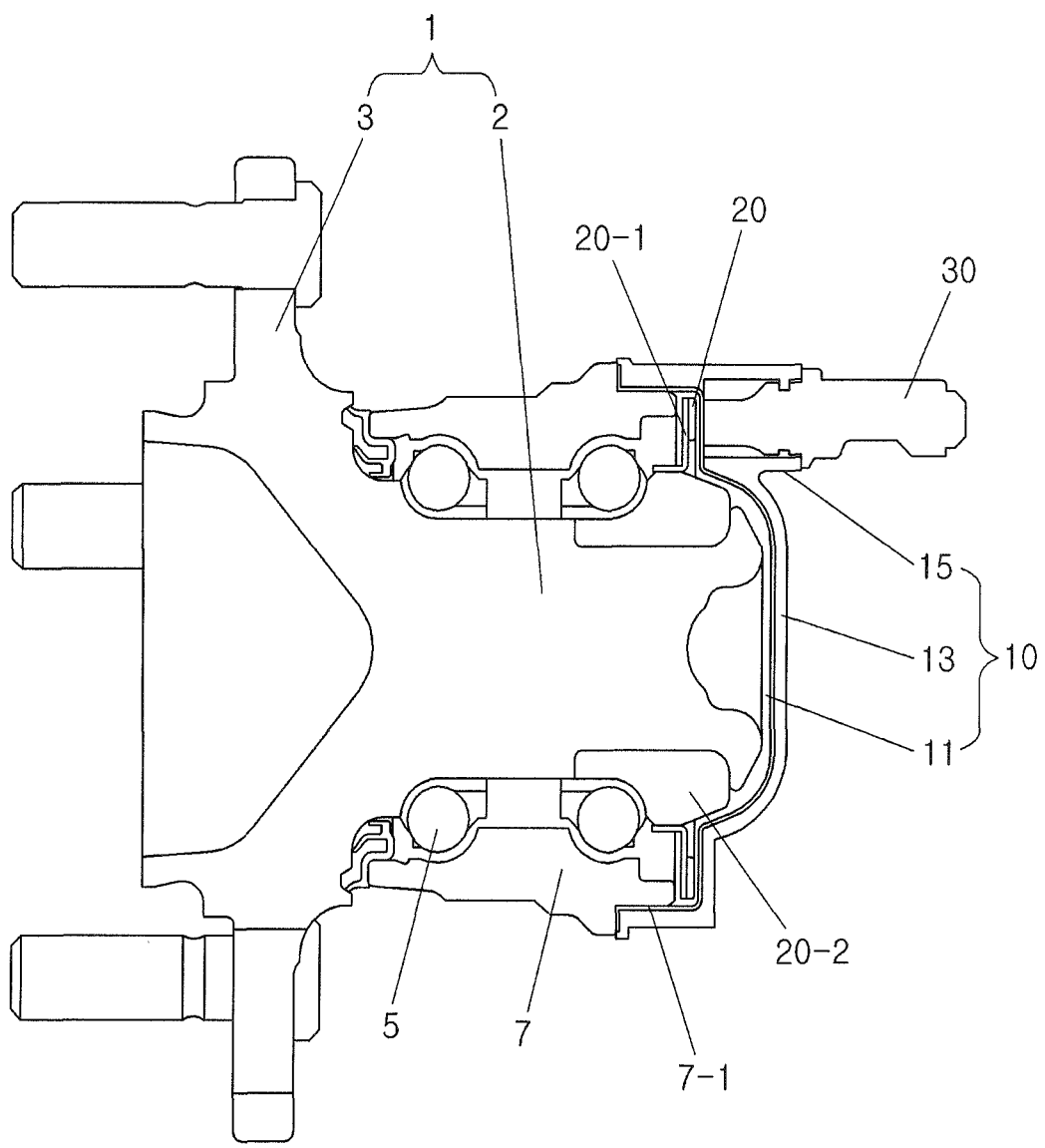
FIG. 1 is a cross-sectional view illustrating a configuration of a magnetic encoder type hub bearing unit according to an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a cross-sectional view illustrating a configuration of a magnetic encoder type hub bearing unit according to an embodiment of the present invention.

As shown in the drawing, the magnetic encoder type hub bearing unit includes a hub bearing 5 located between a hub 1 and a knuckle 7, a sealed cap 10 which is coupled to the knuckle 7 to block the hub bearing 5 from the outside and forms an air gap, an encoder 20 located toward the air gap in a space covered by the sealed cap 10, and a WSS 30 inserted into the sealed cap 10 toward the air gap.

The hub 1 includes a hub shaft 2 to which an inner ring of the hub bearing 5 is fixed, and a fastening plate 3 coupled to a vehicle wheel at one end of the hub shaft 2.

The knuckle 7 is formed with a shaft hole through which the hub shaft 2 passes so that an outer ring of the hub bearing 5 is fixed into the shaft hole, and an outer portion of the knuckle 7 is formed with a cap seating portion 7-1 so that the sealed cap 10 is coupled to the cap seating portion 7-1.

The sealed cap 10 includes an inner housing 11 made of a steel material, an outer housing 13 which is injection molded and is made of a plastic material, and a sensor boss 15 which is integrally formed in the outer housing 13 so that the WSS 30 is inserted into the sensor boss 15.

The encoder 20 is a magnetic type encoder. The encoder 20 is attached to an encoder plate 20-1 and the encoder plate 20-1 is coupled with an encoder support ring 20-2 fixed to the hub shaft 2.

The WSS 30 is coupled to the sensor boss 15 such that a sensor head faces the encoder 20, thereby forming a layout in which the WSS 30 is identically parallel with an axial direction of the hub shaft 2. In the embodiment, the WSS 30 may be any type of a sensor capable of improving sensor sensitivity to the encoder 20 as the air gap becomes smaller. For example, the WSS 30 may be an ABS (Anti Break System) sensor.

Figure 2:
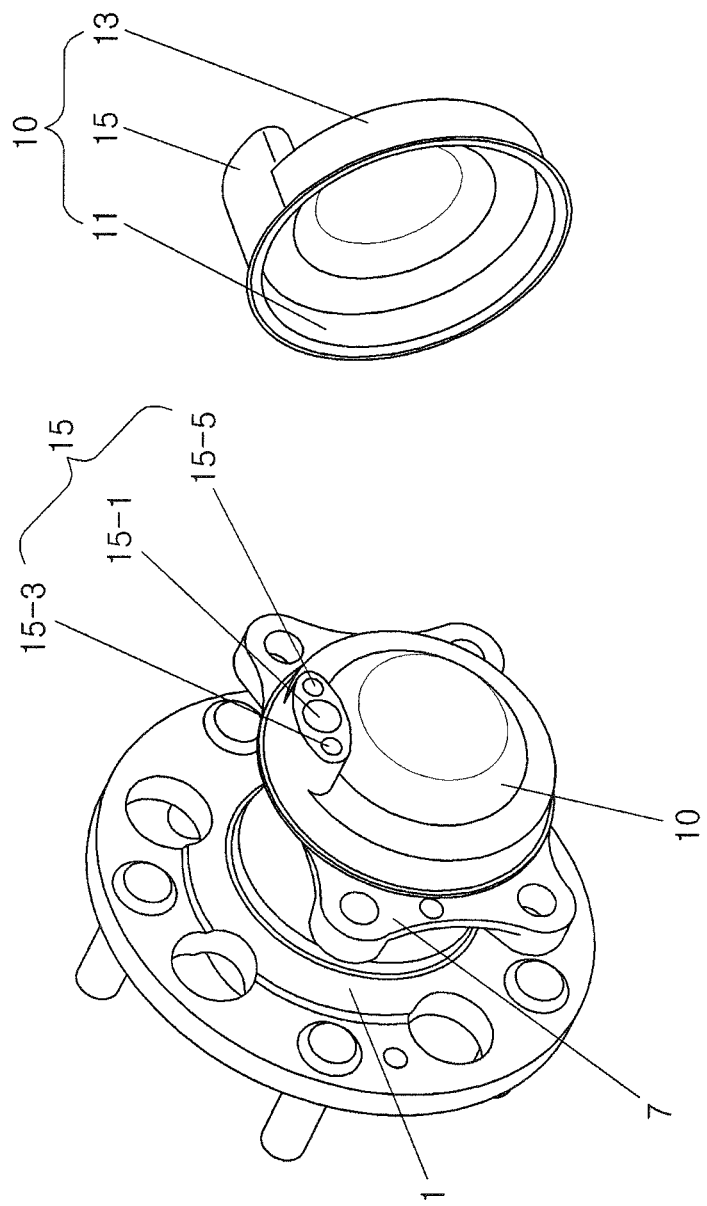
FIG. 2 is a view illustrating a configuration of a sealed cap of the magnetic encoder type hub bearing unit according to the embodiment of the present invention.

Meanwhile, FIG. 2 shows a detailed configuration of the sealed cap 10.

As shown in the drawing, the inner housing 11 forming the sealed cap 10 has a two-level stepped structure, so as to enclose a protrusion part of the hub shaft 2 and simultaneously define a space in which the encoder 20 is located in a coupled state of the inner housing 11 to the knuckle 7.

The outer housing 13 forming the sealed cap 10 has the same shape as the inner housing 11. Thus, the inner housing 11 is fixedly coupled to an inner surface of the outer housing 13.

The sensor boss 15 forming the sealed cap 10 has a mounting hole 15-1, into which the WSS 30 is inserted, and first and second holes 15-3 and 15-5 formed at both left and right sides of the mounting hole 15-1.

Figure 3:
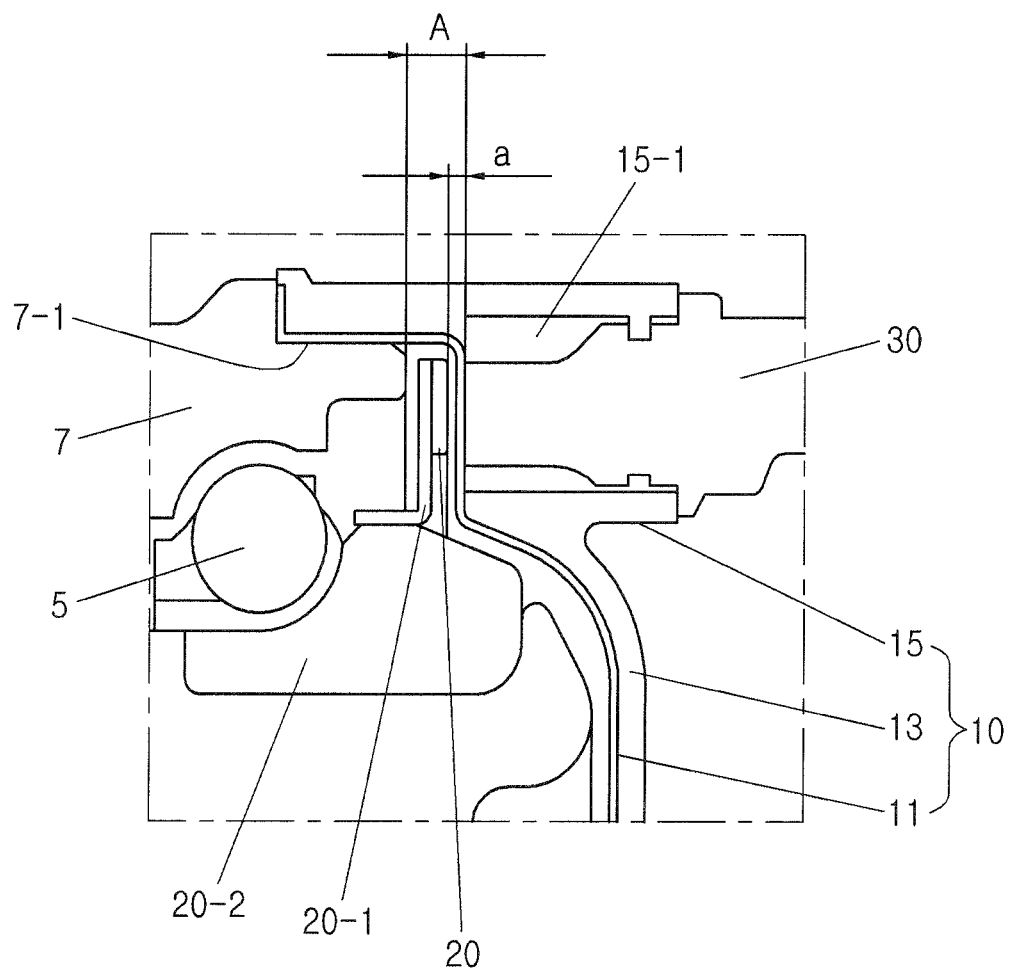
FIG. 3 is a cross-sectional view illustrating a coupled state of an encoder and a WSS while an air gap is formed therebetween according to the embodiment of the present invention.

Meanwhile, FIG. 3 shows the air gap according to the embodiment.

As shown in the drawing, when the WSS 30 is inserted into the mounting hole 15-1 of the sensor boss 15 for assembling them, the sensor head of the WSS 30 is maintained in a state of being pressed against the inner housing 11.

Therefore, the air gap "a" is formed by a thickness of the inner housing 11, and a distance between the inner housing 11 and the encoder 20 located in a clearance A formed by the inner housing 11 and the hub bearing 5.

Thus, the air gap "a" depends upon the thickness of the inner housing 11 while no spaced distance is formed by the WSS 30. Consequently, when the thickness of the inner housing 11 is reduced, the air gap "a" may also be reduced together.

As described above, the magnetic encoder type hub bearing unit, according to the embodiment, includes the encoder 20 located in an inner space defined by the sealed cap 10 for blocking the hub bearing 5 from the outside, and the WSS 30 inserted into the sealed cap 10 toward the air gap "a" formed by the distance between the encoder 20 and the surface of the inner housing 11 and the thickness of the inner housing 11. Consequently, it may be possible to minimize the air gap "a" and thus improve performance of the WSS, and particularly to prevent contamination on the WSS 30 due to external foreign matters or malfunction of the WSS 30 due to magnetic foreign matters by preventing exposure of the sensor head of the WSS 30 to the outside using the sealed cap 10.

In accordance with the exemplary embodiments of the present invention, it may be possible to minimize an air gap formed between a WSS and a magnetic encoder by directly installing the WSS inside a sealed cap for blocking a hub bearing from the outside, and particularly to improve performance of the WSS by minimizing the air gap through a reduction in thickness of a steel material provided in an inner space of the sealed cap.

In accordance with the exemplary embodiments of the present invention, since the WSS is directly installed within the sealed cap, the air gap may not be affected by an assembly tolerance between an ABS sensor, a sealed cap, and peripheral parts.

In accordance with the exemplary embodiments of the present invention, since the sealed cap is injection molded with plastic, it may have a reduced weight compared to a sealed cap made of a steel material.

In accordance with the exemplary embodiments of the present invention, it may be possible to prevent contamination on a WSS head due to external foreign matters by forming the air gap by full insertion of the WSS head into the plastic injection-molded sealed cap, and particularly to prevent malfunction of the WSS by basically blocking introduction of magnetic foreign matters into the air gap.

While the present invention has been described with respect to the specific embodiments, it will be apparent to those skilled in the art that various changes and modifications may be made without departing from the spirit and scope of the invention as defined in the following claims.

What is claimed is:

1. A magnetic encoder type hub bearing unit comprising:
a hub bearing to be fixed to a hub of a vehicle wheel;
a knuckle fixed to the hub bearing;
a cap coupled to the knuckle to define an inner space in which the hub bearing is placed, the cap comprising an outer case and an inner case made of a steel material and fixed to the outer case, the inner case comprising an inner surface facing the inner space, the outer case defining an opening through which the inner case is exposed;
an encoder fixed to the hub in the inner space while being spaced from the inner surface of the inner case; and
a wheel speed sensor (WSS) fixed to the cap and comprising a sensor head portion extending through the opening toward the encoder such that the inner case is interposed between the encoder and the sensor head portion, wherein the sensor head portion contacts the inner case.

2. The magnetic encoder type hub bearing unit of claim 1, wherein a portion of the outer case is not interposed between the sensor head portion and the inner case.

3. The magnetic encoder type hub bearing unit of claim 1, wherein the outer case is made of a plastic material, and comprises a sensor boss defining the opening, wherein the WSS is inserted into the sensor boss.

4. The magnetic encoder type hub bearing unit of claim 1, wherein the encoder is attached to an encoder plate and the encoder plate is coupled with an encoder support ring fixed to a hub shaft of the hub.

5. The magnetic encoder type hub bearing unit of claim 1, wherein the hub comprises a hub shaft to which an inner ring of the hub bearing is fixed, and a fastening plate coupled to the vehicle wheel at one end of the hub shaft.

6. The magnetic encoder type hub bearing unit of claim 1, wherein the knuckle is fixed with an outer ring of the hub bearing, and the cap is coupled to the knuckle in an outward direction for blocking the hub bearing to the outside.

7. The magnetic encoder type hub bearing unit of claim 6, wherein the knuckle is formed with a shaft hole through which a hub shaft for fixing an inner ring of the hub bearing passes, and the outer ring of the hub bearing is fixed into the shaft hole.

8. A vehicle wheel comprising the magnetic encoder type hub bearing unit of claim 7.

9. A vehicle comprising the vehicle wheel of claim 8.

10. The magnetic encoder type hub bearing unit of claim 6, wherein the knuckle is formed with a cap seating portion to which the cap is coupled.

11. A vehicle wheel comprising the magnetic encoder type hub bearing unit of claim 1.

12. The vehicle wheel of claim 11, wherein a gap between the encoder and the sensor head portion is defined by the sum of a distance between the encoder and the inner surface of the inner case and a thickness of the inner case.

13. The vehicle wheel of claim 11, wherein the sensor head portion of the WSS is pressed against the surface of the inner case.

14. A vehicle comprising the vehicle wheel of claim 11.

15. A magnetic encoder type hub bearing unit, comprising:
a hub bearing to be fixed to a hub of a vehicle wheel;
a knuckle fixed to the hub bearing;
a cap coupled to the knuckle to define an inner space in which the hub bearing is placed, the cap comprising an outer case and an inner case made of a steel material and fixed to the outer case, the inner case comprising an inner surface facing the inner space, the outer case defining an opening through which the inner case is exposed;
an encoder fixed to the hub in the inner space while being spaced from the inner surface of the inner case; and
a wheel speed sensor (WSS) fixed to the cap and comprising a sensor head portion extending through the opening toward the encoder such that the inner case is interposed between the encoder and the sensor head portion,
wherein a gap between the encoder and the sensor head portion is defined by the sum of a distance between the encoder and the inner surface of the inner case and a thickness of the inner case.

16. A vehicle wheel comprising the magnetic encoder type hub bearing unit of claim 15.

17. A vehicle comprising the vehicle wheel of claim 16.

18. A magnetic encoder type hub bearing unit, comprising:
a hub bearing to be fixed to a hub of a vehicle wheel;
a knuckle fixed to the hub bearing;
a cap coupled to the knuckle to define an inner space in which the hub bearing is placed, the cap comprising an outer case and an inner case made of a steel material and fixed to the outer case, the inner case comprising an inner surface facing the inner space, the outer case defining an opening through which the inner case is exposed;
an encoder fixed to the hub in the inner space while being spaced from the inner surface of the inner case; and
a wheel speed sensor (WSS) fixed to the cap and comprising a sensor head portion extending through the opening toward the encoder such that the inner case is interposed between the encoder and the sensor head portion,
wherein the sensor head portion of the WSS is pressed against the surface of the inner case.

19. A vehicle wheel comprising the magnetic encoder type hub bearing unit of claim 18.

20. A vehicle comprising the vehicle wheel of claim 19.

* * * * *